(12) United States Patent
Sinn et al.

(10) Patent No.: US 10,637,931 B2
(45) Date of Patent: Apr. 28, 2020

(54) IMAGE SESSION IDENTIFIER TECHNIQUES

(71) Applicant: Adobe Inc., San Jose, CA (US)

(72) Inventors: Richard P. Sinn, Milpitas, CA (US);
Allan M. Young, Santa Rosa, CA (US);
Thomas T. Donahue, Carlsbad, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/722,689

(22) Filed: Oct. 2, 2017

(65) Prior Publication Data

US 2018/0027078 A1    Jan. 25, 2018

Related U.S. Application Data

(63) Continuation of application No. 14/180,610, filed on Feb. 14, 2014, now abandoned.

(51) Int. Cl.
| | |
|---|---|
| H04L 29/08 | (2006.01) |
| H04W 4/21 | (2018.01) |
| H04L 12/58 | (2006.01) |
| H04N 21/60 | (2011.01) |
| H04W 12/00 | (2009.01) |
| H04W 12/04 | (2009.01) |

(52) U.S. Cl.
CPC ............. *H04L 67/14* (2013.01); *H04L 51/10* (2013.01); *H04L 67/10* (2013.01); *H04L 67/141* (2013.01); *H04L 67/146* (2013.01); *H04N 21/60* (2013.01); *H04W 4/21* (2018.02); *H04W 12/003* (2019.01); *H04W 12/04* (2013.01); *H04L 51/32* (2013.01); *H04W 12/00522* (2019.01)

(58) Field of Classification Search
CPC ..... H04L 67/14; H04L 67/146; H04L 67/141; H04L 51/10; H04L 51/32; H04W 4/21; H04W 12/04; H04N 21/60
USPC .......................................... 709/203, 204, 227
See application file for complete search history.

(56) References Cited

U.S. PATENT DOCUMENTS

| | | | |
|---|---|---|---|
| 6,748,420 B1 | 6/2004 | Quatrano et al. | |
| 7,003,574 B1 | 2/2006 | Bahl | |
| 7,546,376 B2 | 6/2009 | Widegren et al. | |
| 9,083,770 B1 | 7/2015 | Drose et al. | |
| 9,112,683 B2 | 8/2015 | Tran | |
| 9,203,841 B2 | 12/2015 | Neuman et al. | |
| 2002/0038293 A1 | 3/2002 | Seiden | |
| 2004/0037240 A1 | 2/2004 | Gautney et al. | |
| 2004/0103279 A1 | 5/2004 | Alten | |

(Continued)

OTHER PUBLICATIONS

"Examiner's Answer to Appeal Brief", U.S. Appl. No. 14/180,610, dated Aug. 1, 2016, 8 pages.

(Continued)

*Primary Examiner* — Michael Won
(74) *Attorney, Agent, or Firm* — SBMC (57) ABSTRACT

Image session identifier techniques are described. In one or more implementations, a request is received to create an image sharing session and a session identifier is generated for the image sharing session that is configured to act as a credential to join the image sharing session as a member. A communication is formed that includes the generated session identifier and that is configured for communication via a network to an originator of the request.

20 Claims, 8 Drawing Sheets

(56) References Cited

U.S. PATENT DOCUMENTS

| | | | |
|---|---|---|---|
| 2009/0055904 A1 | 2/2009 | Gomi et al. | |
| 2010/0144444 A1* | 6/2010 | Graham | A63F 13/10 463/42 |
| 2011/0078919 A1* | 4/2011 | Yang | A43B 3/20 36/1.5 |
| 2011/0219427 A1 | 9/2011 | Hito et al. | |
| 2012/0023167 A1 | 1/2012 | Hovdal et al. | |
| 2012/0198531 A1* | 8/2012 | Ort | H04W 12/06 726/7 |
| 2012/0244891 A1* | 9/2012 | Appleton | G06Q 10/107 455/466 |
| 2013/0018960 A1 | 1/2013 | Knysz et al. | |
| 2013/0066978 A1 | 3/2013 | Bentley et al. | |
| 2013/0073685 A1* | 3/2013 | Isaza | H04L 67/06 709/219 |
| 2013/0086651 A1 | 4/2013 | Kavantzas et al. | |
| 2013/0111549 A1 | 5/2013 | Sowatskey et al. | |
| 2013/0263211 A1 | 10/2013 | Neuman et al. | |
| 2013/0268302 A1* | 10/2013 | Jayaram | G06Q 30/06 705/5 |
| 2014/0059124 A1 | 2/2014 | Song et al. | |
| 2014/0143337 A1 | 5/2014 | McIntosh et al. | |
| 2014/0173125 A1* | 6/2014 | Selvanandan | H04L 67/141 709/229 |
| 2014/0344350 A1* | 11/2014 | Sinn | H04L 65/403 709/204 |
| 2014/0365281 A1 | 12/2014 | Onischuk | |
| 2014/0365778 A1 | 12/2014 | Wang | |
| 2015/0104017 A1 | 4/2015 | Halford et al. | |
| 2015/0237031 A1 | 8/2015 | Neuman et al. | |
| 2015/0237143 A1 | 8/2015 | Sinn et al. | |
| 2015/0244539 A1* | 8/2015 | Ickman | H04W 4/21 709/204 |
| 2015/0288667 A1* | 10/2015 | Alder | H04L 63/061 713/171 |
| 2017/0026672 A1* | 1/2017 | Dacus | G06Q 30/0233 |
| 2017/0048334 A1* | 2/2017 | Shibahara | H04L 67/146 |
| 2018/0198831 A1* | 7/2018 | Calcaterra | H04L 65/403 |
| 2018/0225444 A1* | 8/2018 | Frenz | H04L 9/0841 |

OTHER PUBLICATIONS

"Final Office Action", U.S. Appl. No. 114/180,610, dated Dec. 11, 2015, 17 pages.

"Non-Final Office Action", U.S. Appl. No. 14/180,610, dated Aug. 27, 2015, 12 pages.

"PTAB Decision", U.S. Appl. No. 14/180,610, filed Aug. 1, 2017, 7 pages.

* cited by examiner

IMAGE SESSION IDENTIFIER TECHNIQUES

RELATED APPLICATION

This application is a continuation of and claims priority to U.S. patent application Ser. No. 14/180,610, filed Feb. 14, 2014, entitled "Image Session Identifier Techniques", the entire disclosure of which is hereby incorporated by reference herein in its entirety.

BACKGROUND

The prevalence of image capture devices is ever increasing. This may be due in part to inclusion of cameras in mobile communications devices such as mobile phones, tablets, and so on. Because of this, users may be able to capture images at a variety of different locations as desired.

For example, a user may view and/or participate in an event, such as a sports event, concert, social event (e.g., wedding, birthday), and so on. Because the event may have quite a few attendees, there may be a good likelihood of images being captured by a large portion of the attendees due to the prevalence of image capture devices. However, conventional techniques that were utilized to share images could be involved and thus even though images may be captured by a variety of different attendees it may be difficult to share these images between the attendees.

SUMMARY

Image session identifier techniques are described. In one or more implementations, a request is received to create an image sharing session and a session identifier is generated for the image sharing session that is configured to act as a credential to join the image sharing session as a member. A communication is formed that includes the generated session identifier and that is configured for communication via a network to an originator of the request.

In one or more implementations, a request is received from an originator to create an image sharing session, the request generated through interaction by the originator with an application executable by a computing device of the originator. Responsive to the receipt of the request, a plurality of session identifiers are generated for an image sharing session that is configured to act as a credential to join the image sharing session as a member. The plurality of session identifiers include a quick response (QR) code, a network address that is usable to access images associated with the image sharing session without providing additional credentials, and a string of one or more text characters that are human readable. A communication is formed that includes the generated plurality of session identifiers that are configured for distribution by the origination via the application to one or more potential members of the image sharing session.

In one or more implementations a system includes one or more computing devices having one or more modules implemented at least partially in hardware, the one or more modules are configured to perform operations. The operations include exposing a session identifier for an image sharing session that is configured to act as a credential to join the image sharing session as a member, receiving a communication including the session identifier from a potential member, and adding the potential member as a member of the image sharing session to support sharing of images between members of the image sharing session. The operations also include generating a user interface that is usable by a manager of the image sharing session to manage membership of the image sharing session.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

In group photography, one of the most difficult problems is to gather people in a group to take and share pictures together of an event. The problem becomes even more difficult for large events, such as for a national sporting event, concert of a popular singer, a big wedding or any other event having, ten, hundreds, and even thousands of people.

Conventional techniques, however, required a user to have knowledge of an identifier of a potential contributor, e.g., email address, phone number, social network name, and so on. The user then somehow invited the potential contributor manually via an email, social network service, and so on. After the potential contributor accepts the invitation, the contributor may then join in sharing of images. This manual event management system may therefore create a relatively high bar for the user and well as the contributor to "jump through" before being able to share images.

Image session identifier techniques are described. In one or more implementations, an image session identifier is generated that is usable as a credential to join an image sharing session. Thus, rather that obtain user identification and then use this identification to add the user to an image sharing session as described above, an image session identifier of the image sharing session itself may be utilized as a credential and support management of access to the image sharing session.

A user, for instance, may utilize an application obtained from an online application store or elsewhere to form a request to create an image sharing session. Thus, the user in this instance is an originator of the image sharing session. A service provider may receive the request and generate a session identifier to be communicated back to the originator as well as leverage the identifier to manage the image sharing session. The session identifier may be configured and distributed in a variety of different ways, such as via email, SMS, as a quick response (QR) code (e.g., included as part of a poster, brochure, and so on), speak a string of textual characters included in the session identifier (e.g., for manual entry by another user of the application to join the event), and so forth.

Thus, the session identifier may enable a potential contributor to directly enter the image sharing session and may in turn email, SMS or use any offline technique to distribute the session identifier to other potential contributors. Anyone with the session identifier may also then leverage the identifier to easily join the image sharing session.

Further, the originator (i.e., manager) of the image sharing session may also be granted permissions to manage membership of the image sharing session as well as images shared as part of the image sharing session. In this way, the originator may be granted full control of a contributor list of a session and can easily delete and block potential contributors from joining the session through interaction with a user interface output by the application. Thus, the image session identifier may be utilized to enable efficient access and management of contributors as part of an image sharing session. Further discussion of these and other examples may be found in relation to the following sections.

In the following discussion, an example environment is first described that may employ the image session identifier techniques described herein. Example procedures are then described which may be performed in the example environment as well as other environments. Consequently, performance of the example procedures is not limited to the example environment and the example environment is not limited to performance of the example procedures.

Example Environment

Figure 1:
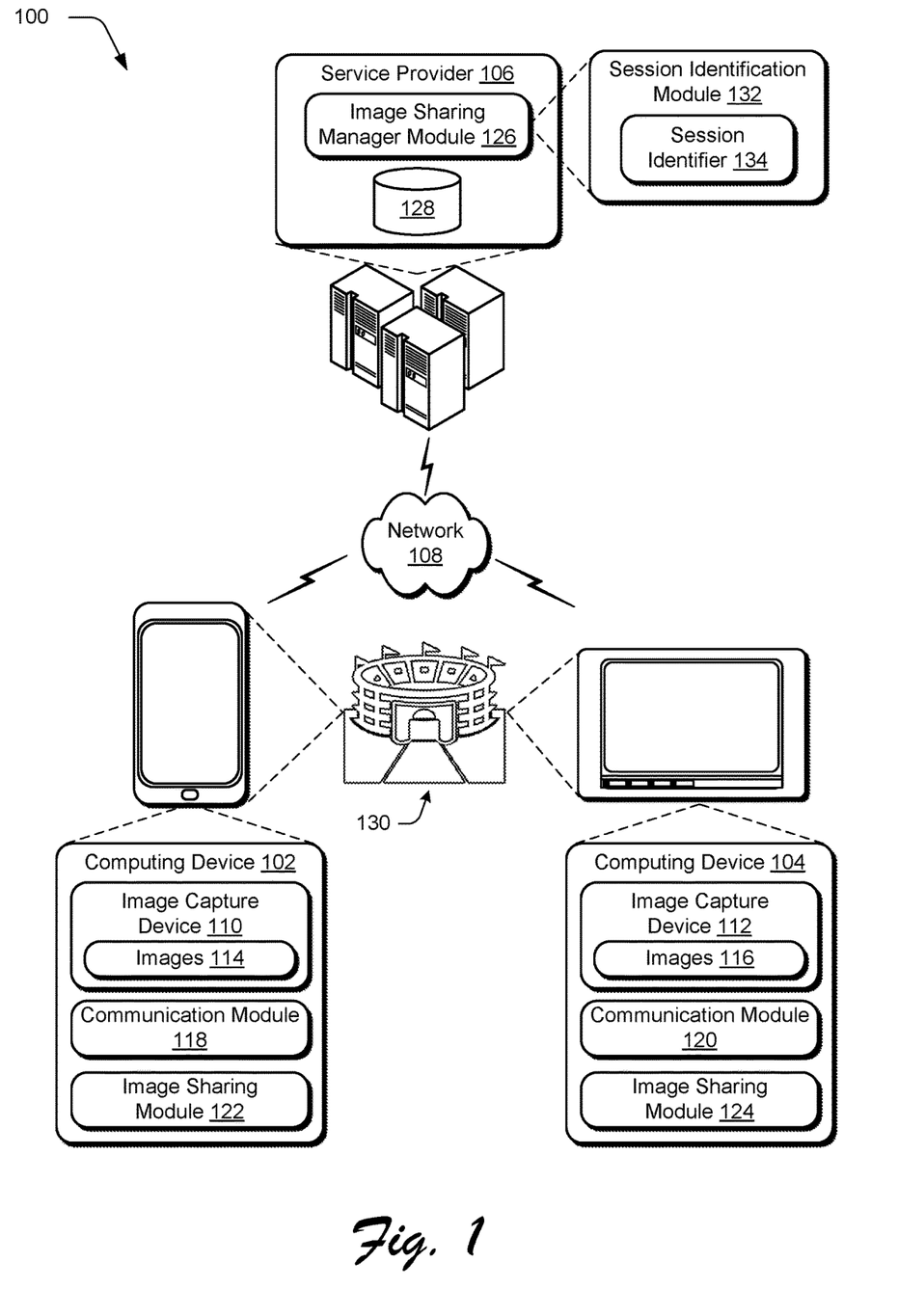
FIG. 1 is an illustration of an environment in an example implementation that is operable to employ techniques described herein relating to image session identifiers.

FIG. 1 is an illustration of an environment 100 in an example implementation that is operable to employ techniques described herein. The illustrated environment 100 includes computing devices 102, 104 and a service provider 106 that are communicatively coupled via a network 108. The computing devices 102, 104 may be configured in a variety of ways.

The computing devices 102, 104 for instance, may be configured as desktop computers, laptop computers, a mobile device (e.g., assuming a handheld configuration such as a tablet or mobile phone), and so forth. Thus, the computing devices 102, 104 may range from full resource devices with substantial memory and processor resources (e.g., personal computers, game consoles) to a low-resource device with limited memory and/or processing resources (e.g., mobile devices, a dedicated camera, video recorder, and so on). Additionally, each of the computing devices 102, 104 may be representative of a plurality of different devices, such as multiple servers utilized by a business to perform operations "over the cloud" as shown as implementing the service provider 106 and as further described in relation to FIG. 8.

Each of the computing devices 102, 104 is illustrated as including a respective image capture device 110, 112. The images capture devices 110, 112 are representative of software and hardware functionality to capture images 114, 116, respectively. As such, the image capture devices 110, 112 may be configured in a variety of ways to capture images, such as through use of a charge coupled device (CCD) and so on.

The computing devices 102, 104 are also illustrated as including respective communication modules 118, 120. The communication modules 118, 120 are representative of functionality to communicate via the network 108. For example, the communication modules 118, 120 may include software and hardware to support a wired network connection, such as with a wired Ethernet, modem to a plain old telephone system (POTS), cable connection, digital subscriber line (DSL), and so on.

The communication modules 118, 120 may also include functionality to communicate with the network 108 wirelessly. This may include support of short to mid-range communication, which may include near (e.g., IEEE 802.15.1 standards also known as "Bluetooth") and mid-range (e.g., IEEE 802.11 standards also known as "Wi-Fi") wireless communications over a wireless local area network. This may also include use for relatively far distances over a wireless wide area network, including IEEE 802.16 which is also known as "WiMAX," cellular technologies (e.g., 3G, 4G, LTE), and so on.

As previously described, one of the most difficult problems in group photography is to gather people in the group to take pictures together in an event. Conventional techniques involved manual invitations and collection of user identification via email or via a social network to share images. However, invitations sent this way often created obstacles for invitees, which could hinder a user's desire to participate in sharing images.

Accordingly, image session invitation and management techniques may be employed by the environment 100. As illustrated, the computing devices 102, 104 include respective image sharing modules 122, 124 and the service provider 106 includes an image sharing manager module 126 and storage 128. These modules are representative of functionality to create and manage membership of an image sharing session. For example, a user of computing device 102 may attend an event 130, such as a sporting event as illustrated, a social event (e.g., birthday, wedding), concert, speech, and so on. The image sharing module 122 may provide an option to create an image sharing session for association with the event through communication with the image sharing manger module 126 via the network 106.

The user may then utilize the image sharing module 122 and computing device 102 to invite other attendees of the event 130 to join the image sharing session. This may be performed in a variety of ways, such as to employ a session identification module 132 to generate session identifiers 134 that are usable as credentials to add potential members to the image sharing session.

The image sharing session may then be managed by the image sharing manager module 126 to share images between members of the session. This may include support of sharing of images from storage 128, support of direct communication between the computing devices 102, 104 without communication through the service provider 106, and so on. Further discussion of these and other techniques may be found in the following examples.

Figure 2:
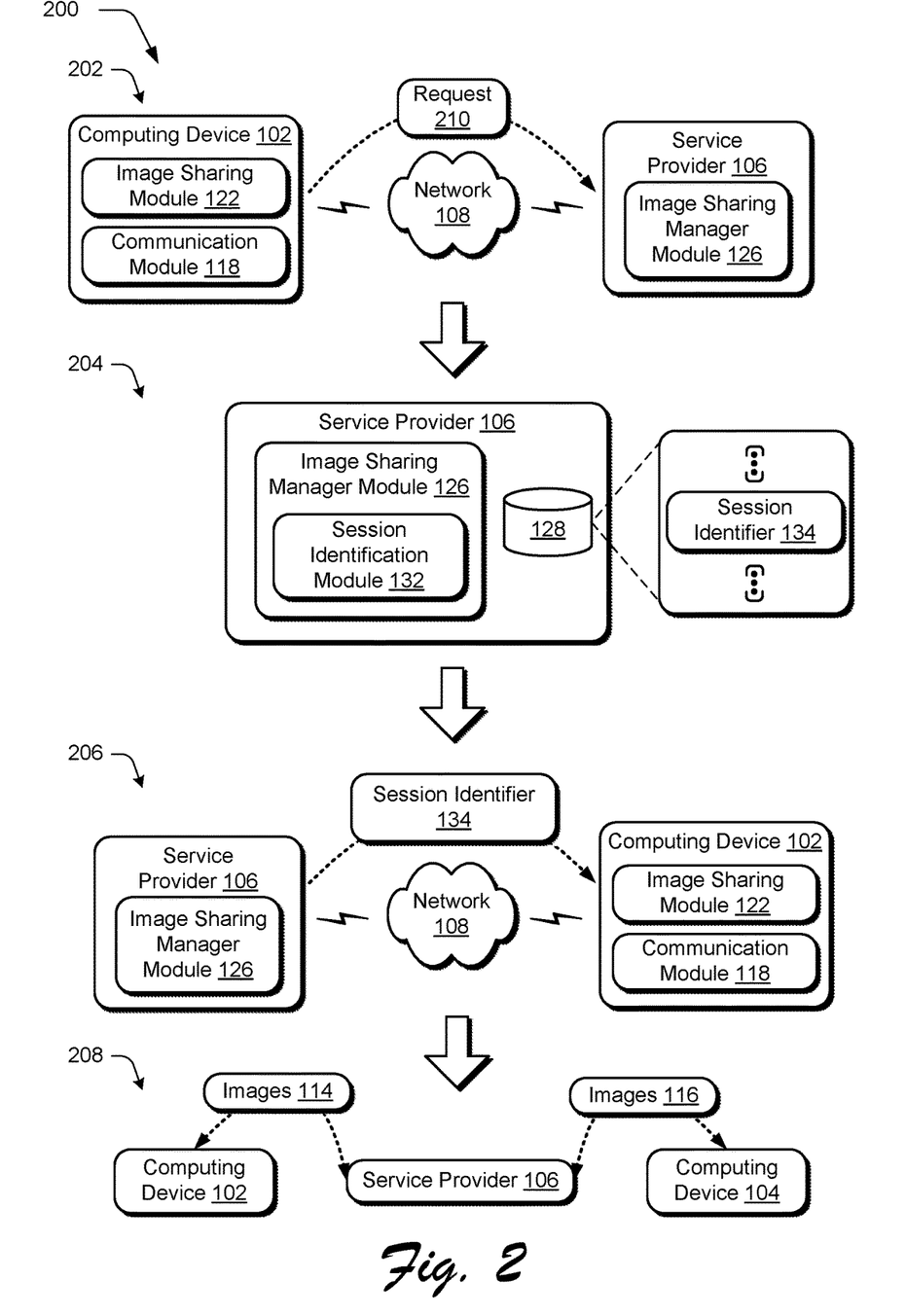
FIG. 2 depicts an example system that employs image session identifier techniques to invite potential members to join an image sharing session.

FIG. 2 depicts an example system 200 that employs image session identifier techniques to invite potential members to join an image sharing session. The system 200 is shown using first, second, third, and fourth stages 202, 204, 206, 208. A user may obtain the image sharing module 122 in a variety of ways, such as via an application downloaded from the service provider 106, via an application store maintained by another service provider (e.g., where the image sharing module 122 is available for a fee, is free in return for viewing advertisements), and so on.

As shown in the first stage 202, the user may then use the image sharing module 122 to interact with the image sharing manager module 126 of the service provider 106. The image sharing module 112, for instance, may output a user interface via which a user may interact to form a request 210 to be communicated over a network 108 to the service provider 106 to create an image sharing session.

Thus, a user of the computing device 102 in this example may be referred to as an originator of the request 210 and thus the image sharing session. Additionally, a role of originator is not limited to a user that initiated creation of the image sharing session but may also refer to a user that has been granted permissions to manage membership and other administrative functions associated with an image sharing session as further described below.

At the second stage 204, the service provider 106 has received the request 210. In response, a session identification module 132 is employed to generate a session identifier 134 for the image sharing session. The session identifier 134 may be generated and configured in a variety of ways, such as a string of text characters, a QR code, a link to a network address, and so on as further described in greater detail in relation to FIG. 3.

At the third stage 206, the session identifier 134 generated at the second stage 204 is communicated over the network 108 back to the computing device 102. The originator may then distribute the session identifier 134 to enable other people to use the identifier as a credential to join the image sharing session, such as to disseminate the session identifier 134 to a user of computing device 104 such that the user may participate as a member of the image sharing session.

At the fourth stage 208, the service provider 106 manages sharing of images 114, 116 between the computing devices 102, 104 as part of the image sharing session. For example, the image sharing module 126 of the service provider 106 may output a user interface via which users of the computing devices 102, 104 may select which images to download, upload, and so on. In this way, the images 114, 116 may be shared between the computing devices 102, 104 as part of the image sharing session. Thus, in this example the session identifier 134 technique may support ease of joining of the image sharing session with an originator of the session having to utilize and know identifications of the user to add them to the session.

Although a single invitation example was described in relation to FIG. 2 it should be readily apparent that multiple image sharing sessions may be supported concurrently. For example, a single image may be shared with multiple image sharing sessions, e.g., by selecting an image and then selecting session identifiers of particular ones of the image sharing sessions.

Figure 3:
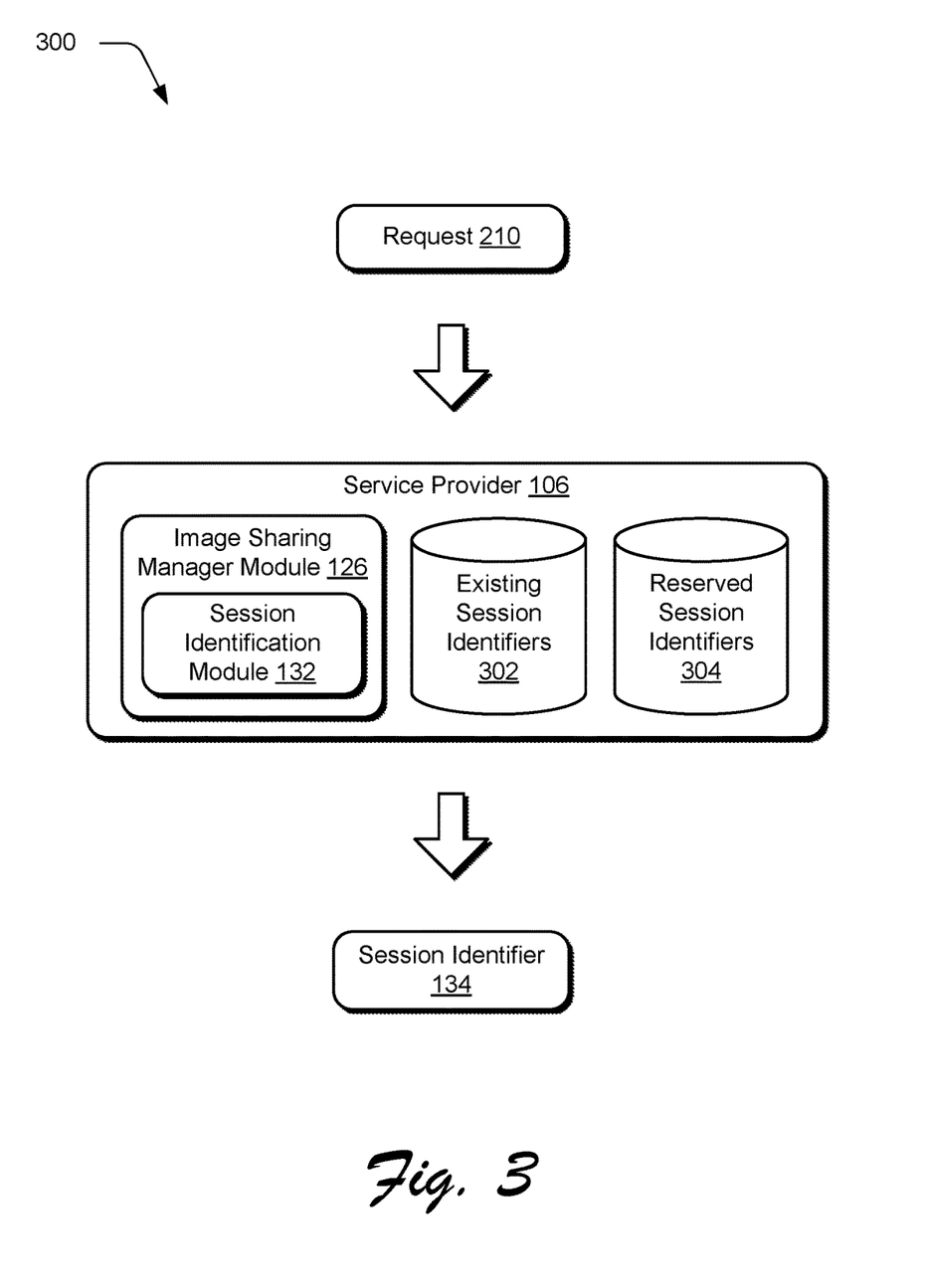
FIG. 3 depicts a system in an example implementation in which generation of the session identifier of FIG. 1 is shown in greater detail.

FIG. 3 depicts a system 300 in an example implementation in which generation of the session identifier 134 is shown in greater detail. A request 210 is received by a service provider 106 and a session identifier 134 is generated responsive to the request 210 as previously described. A user, for instance, may interact with a user interface output by the image sharing module 122 to generate the request and cause the request to be communicated to the service provider 106, e.g., implemented as a web service.

The session identification module 132 may then generate a session identifier 134 to uniquely identify the requested image sharing session. The session identifier 134, for instance, may be persistent such that the same session identifier 134 is generated for a corresponding event. Additionally, the session identifier 134 may have a corresponding expiration date, and by default this may be set to "last in perpetuity".

The originator may also set the expiration for a different period of time based on the type of the event. The originator, for instance, may set the expiration of the session identifier 134 of a wedding photography event to last a single day after the wedding. Thus, potential contributors may join the wedding photo image sharing session before and during the wedding but not later than a day after the wedding. The expiration of the session identifier 134 thus gives the originator control on when potential contributors may join the image sharing session. Since the session identifier 134 is persistent with an originator controlled expiration, the originator may safely share the session identifier 134 using any online or offline technique without worrying that the session identifier 134 will be invalidated by the image sharing manager module 126.

The session identifier 134 may be configured in a variety of ways according to a wide variety of considerations. For example, the request 210 may include information about a corresponding event (e.g., a name of the event, location, and so forth) and leverage this information in generating the session identifier 134. In another example, the request 210 may include one or more requested session identifier 134. The session identification module 132 may then check a collection of existing session identifier 302 to determine whether it is available.

Likewise, the session identification module 132 may also check a collection of reserved session identifiers 304 to determine whether the suggestion and/or an automatically generated session identifier 134 created by the session identification module 132 is available. For example, the registered session identifiers 304 may include product names, event names, registered and unregistered trademarks, taglines, product and service logos, and so on. Since the session identifier 134 is persistent, an administrator at the service provider 106 may make reserved session identifiers 304 available for a fee, e.g., via an auction and so on, for special event opportunities. The session identifier 134 may be configured in a wide variety of ways and consequently support distribution in an equally wide variety of ways, further discussion of which follows and is shown in a corresponding figure.

Figure 4:
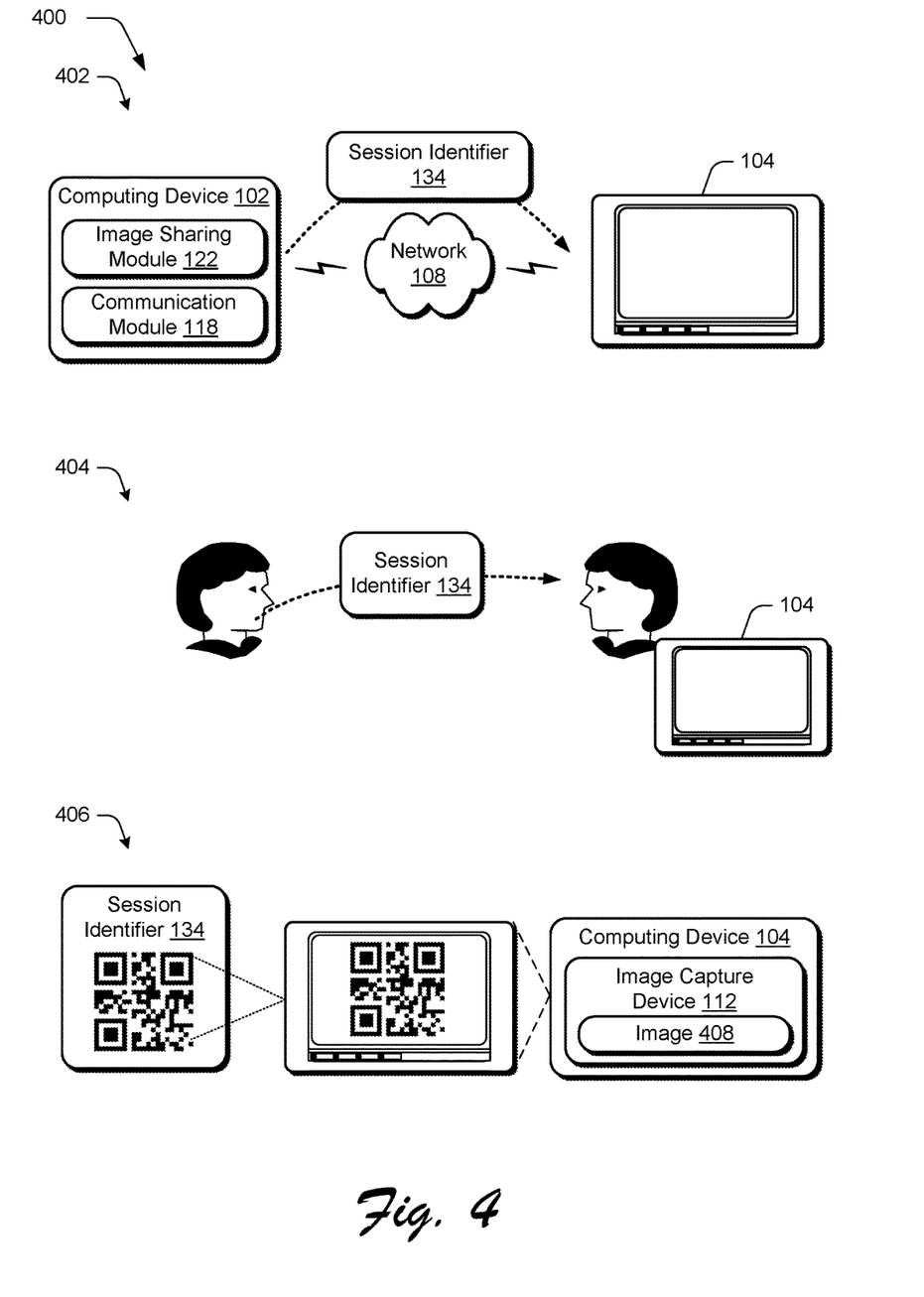
FIG. 4 depicts an example implementation showing a variety of different configurations and distribution techniques supported by a session identifier.

FIG. 4 depicts an example implementation 400 showing a variety of different configurations and distribution techniques supported by a session identifier. First, second, and third examples 402, 404, 406 are illustrated of configurations and distribution techniques of a session identifier.

At the first example 402, the session identifier 134 is configured to be communicated via a network 108. For example, a user may interact with a user interface output by the image sharing module 122. The user may then select an option to cause the session identifier 134 to be communicated via the network 108, such as an SMS, email, and so on. In this example, the session identifier 134 is embedded in and therefore formed as part of a network address, such as a URL having the following syntax:

http://adobegrouppixdomain.com/
invite?inviterName=Richard+Sinn&event
Name=HighSchoolReunion&inviteID=2X7VN6

When the potential contributor associated with computing device 104 clicks on the "Open" button displayed in the URL output by a corresponding image sharing module 124, deep linking may be utilized to allow the contributor to enter the invited image sharing session directly without any additional authentication or navigation. This enables ease of access to the image sharing session for potential contributors.

The session identifier 134 may also be configured as a string of text characters that may be spoken between users as shown in the second example 404. A user, upon hearing the string, may then manually input the string into the image sharing module 124 of the computing device 104 to join the corresponding image sharing session.

The session identifier 134, for instance, may be formatted as a string of six alphanumeric characters. The service provider 106 may also leverage a flexible backend database to track the existing session identifier 134. Thus, if a number of session identifiers becomes large such that an amount of available session identifiers are limited, the service provider 106 may automatically and without user intervention allow a format increase from six alphanumeric to eight alphanumeric to ten alphanumeric characters and so on. In this way, the service provider 106 may increase the number of supported session identifiers as use of the image sharing module increases in popularity.

The session identifier 134 may also be configured as a QR code as illustrated in the third example 406. A potential contributor using the computing device 104 may then scan the QR code using an image capture device 112 thereby capturing an image 408 that is usable to navigate to the service provider 106 over the network 108 to join the image sharing session. For example, the network address in the first example 402 may be formed as a QR code that causes the computing device 104 to perform the deep linking as previously described, further discussion of which may be found below and shown in a corresponding figure.

Figure 5:
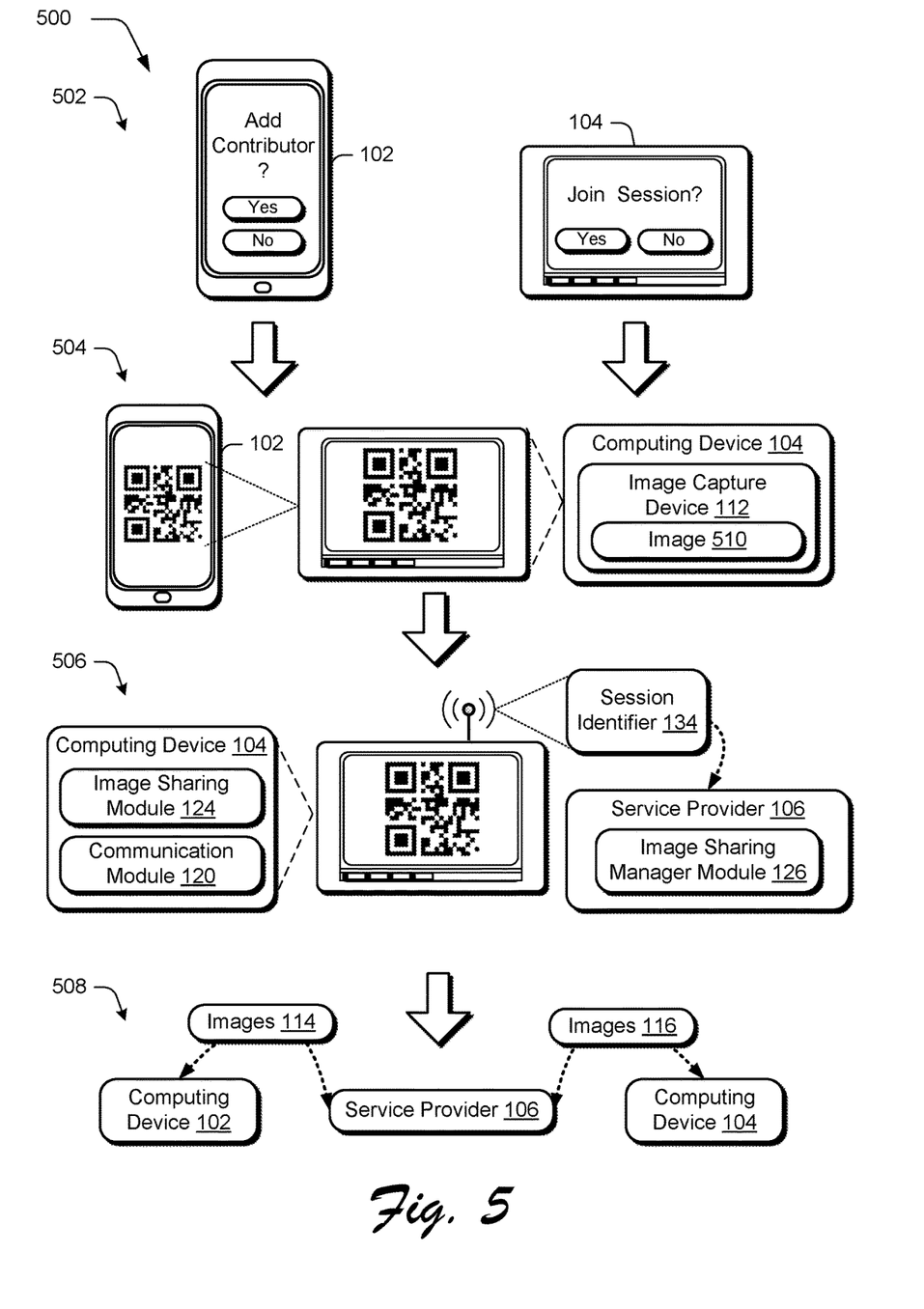
FIG. 5 depicts an example system that employs a distribution technique to invite potential members to join an image sharing session using a scanning technique.

FIG. 5 depicts an example system 500 that employs a session identifier technique to invite potential members to join an image sharing session using a scanning technique. The system 500 is also shown using first, second, third, and fourth stages 502, 504, 506, 508. As before, the computing devices 102, 104 may obtain the image sharing modules in a variety of ways.

At the first stage 502, users of the computing devices 102, 104 may wish to participate in an image sharing session, which in this instance is also created by a user of the computing device 102. Thus, a user interface may be displayed by the computing device 102 that gives an option to add a member to an image sharing session. A user interface displayed by the computing device 104, however, may provide an option that is selectable to join an image sharing session.

At the second stage 504, responsive to selection of the option to add a contributor, the computing device 102 displays a session identifier that is usable to identify the image sharing session, which in this instance in a quick response (QR) code. The session identifier, for instance, may include data received from the service provider 106 responsive to creating the image sharing session that is usable to uniquely identify the session by the image sharing manager module 126.

The computing device 104 may then employ an image capture device 112 to capture an image 510 of the display of the representation by the computing device 102. Thus, the image 510 may be scanned by "taking a picture" of the other computing device 102 that shows the representation on the display device.

At the third stage 506, the image sharing module 124 forms a communication for communication to the service provider 106. The communication may include the session identifier 134, such as the image 510 of the representation, information obtained by processing the image 510, and so on. A communication module 120 may then communicate the session identifier 134 via the network 108 of FIG. 1, which although wireless communication is illustrated is should be readily apparent that wired techniques are also contemplated. The session identifier 134 is usable by the service provider 106 to add the potential member as a member to the image sharing session.

At the fourth stage 508, the service provider 106 manages sharing of images 114, 116 between the computing devices 102, 104 as part of the image sharing session. As before, the images 114, 116 may be shared between the computing devices 102, 104 as part of the image sharing session.

The service provider 106 may also support a variety of different techniques usable to manage membership of an image sharing session. For example, the originator of the image sharing session (or a subsequent user that has been given corresponding permissions) may interact with a user interface to view a list of members of an image sharing session, receive a notification upon a user joining a session, and so on. The originator may then interact with the list to remove members from an image sharing session. The originator may also add a person to a blocked list such that any subsequent request by that person to join the image sharing session is automatically denied.

Thus, an image session identifier system is described that is configured permit potential contributors to quickly, easily, and securely join an image sharing session with minimal overhead, thereby accelerating and enhancing conversion and contributing to a positive user experience. Use of a persistent session identifier may also support use of offline invitation techniques such as printed posters, brochures, sales fliers, and so on. Additionally, a large number of potential contributors may readily join an image sharing session and session identifiers may be upgradable and expandable to address increasing popularity of these techniques. Deep linking of the session identifier may further permit contributors direct access to the session and full session access control may be provided via permissions to an originator of the session, e.g., to permit blacklist and editing of current contributor list of members of the session. Further, a collection of reserved session identifiers may be leveraged as a revenue generation opportunity, e.g., via an offline auction of meaningful session identifiers.

Example Procedures

The following discussion describes image session identifier techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
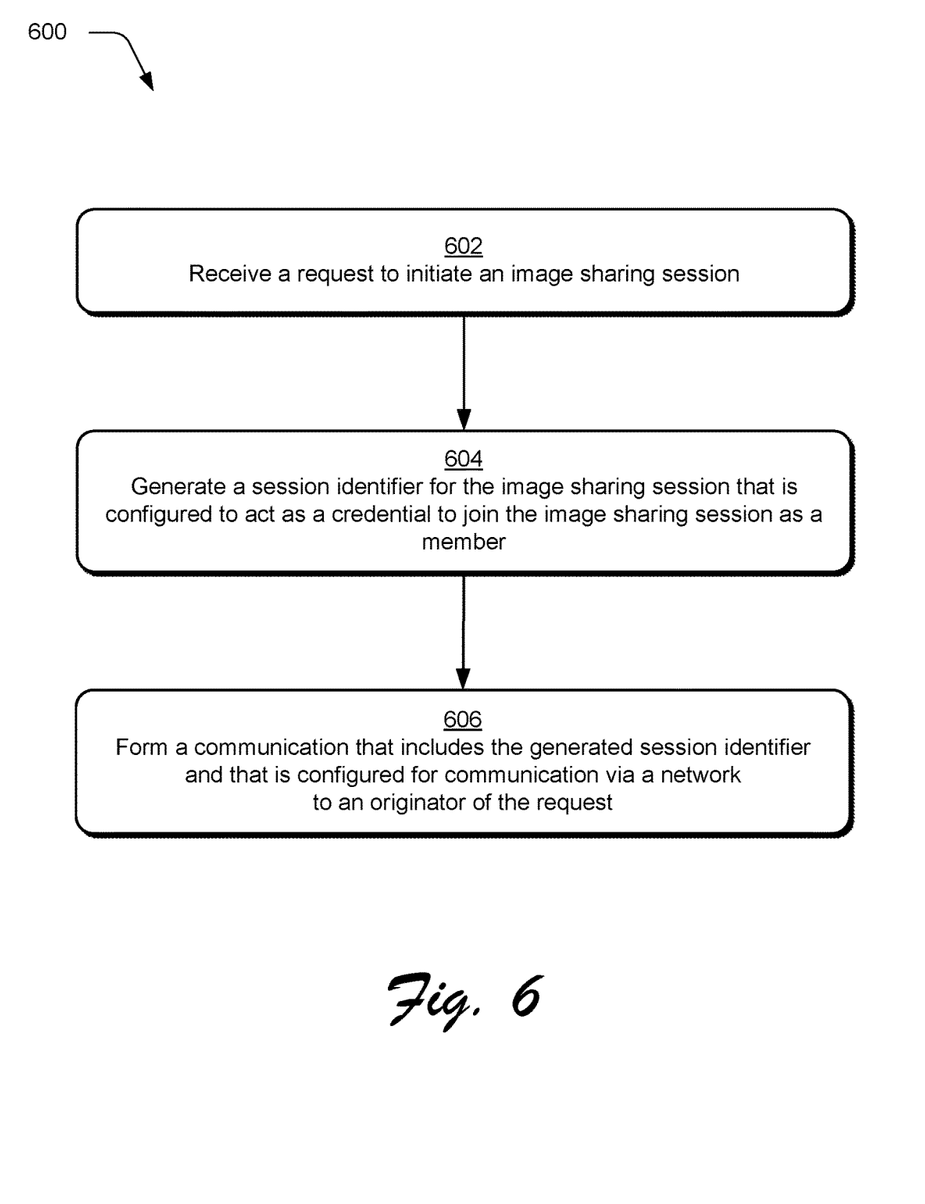
FIG. 6 is a flow diagram depicting a procedure in an example implementation in which a session identifier for an image sharing session is generated responsive to a request.

FIG. 6 depicts a procedure 600 in an example implementation in which a session identifier for an image sharing session is generated responsive to a request. A request is received to create an image sharing session (block 602) and a session identifier is generated for the image sharing session that is configured to act as a credential to join the image sharing session as a member (block 604). As shown in FIG. 2, for instance, the service provider 106 may include an image sharing manager module 126 that is configured to manage an image sharing session.

The image sharing manager module 126 may include a session identification module 132 that is representative of functionality to generate a session identifier 134 automatically and without further user intervention. This may include use of information provided in the request 210 that describes an event associated with the image sharing session, use of existing session identifier 302 and reserved session identifier 304 collections, and so on.

A communication is formed that includes the generated session identifier and that is configured for communication via a network to an originator of the request (block 606). The communication, for instance, may include the session identifier in a human readable form that may be spoken or typed by a user as a credential to gain access to an image sharing session without providing additional information, such as to identify the particular user although other examples are also contemplated.

Figure 7:
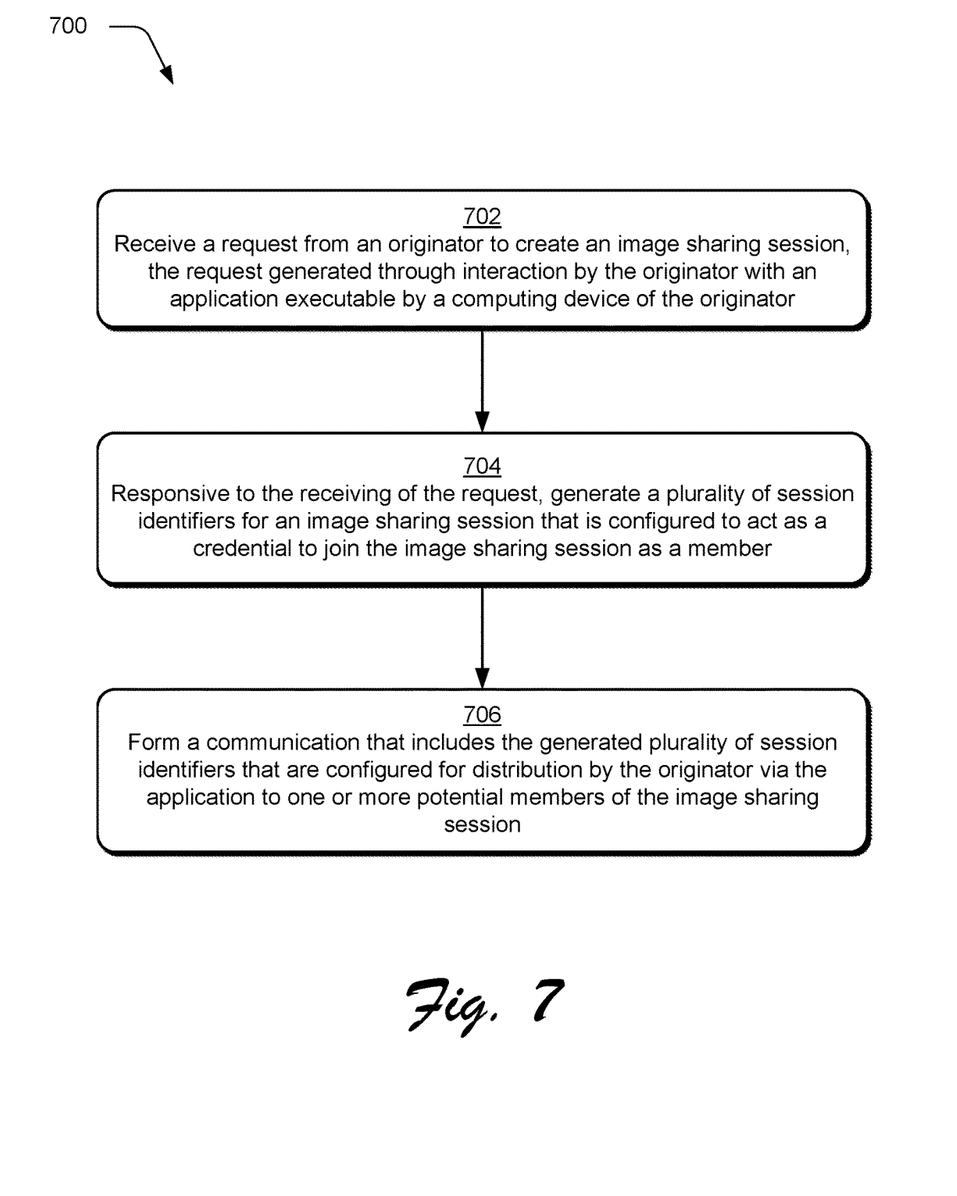
FIG. 7 is a flow diagram depicting another procedure in an example implementation in which a plurality of session identifiers are generated.

FIG. 7 depicts another procedure 700 in an example implementation in which a plurality of session identifiers are generated. A request is received from an originator to create an image sharing session, the request generated through interaction by the originator with an application executable by a computing device of the originator (block 702). The image sharing module 122 in this instance may be obtained as a targeted application from an application store as previously described.

Responsive to the receipt of the request, a plurality of session identifiers are generated for an image sharing session that is configured to act as a credential to join the image sharing session as a member (block 704). The plurality of session identifiers may be configured in a variety of ways. For example, the session identifiers may include a quick response (QR) code, a network address that is usable to access images associated with the image sharing session without providing additional credentials, and a string of one or more text characters that are human readable.

A communication is formed that includes the generated plurality of session identifiers that are configured for distribution by the origination via the application to one or more potential members of the image sharing session (block 706). This variety of identifier configurations may then be leveraged by the image sharing module 122 for distribution to a variety of different potential contributors in a variety of different ways as shown and described in relation to FIG. 4.

Example System and Device

Figure 8:
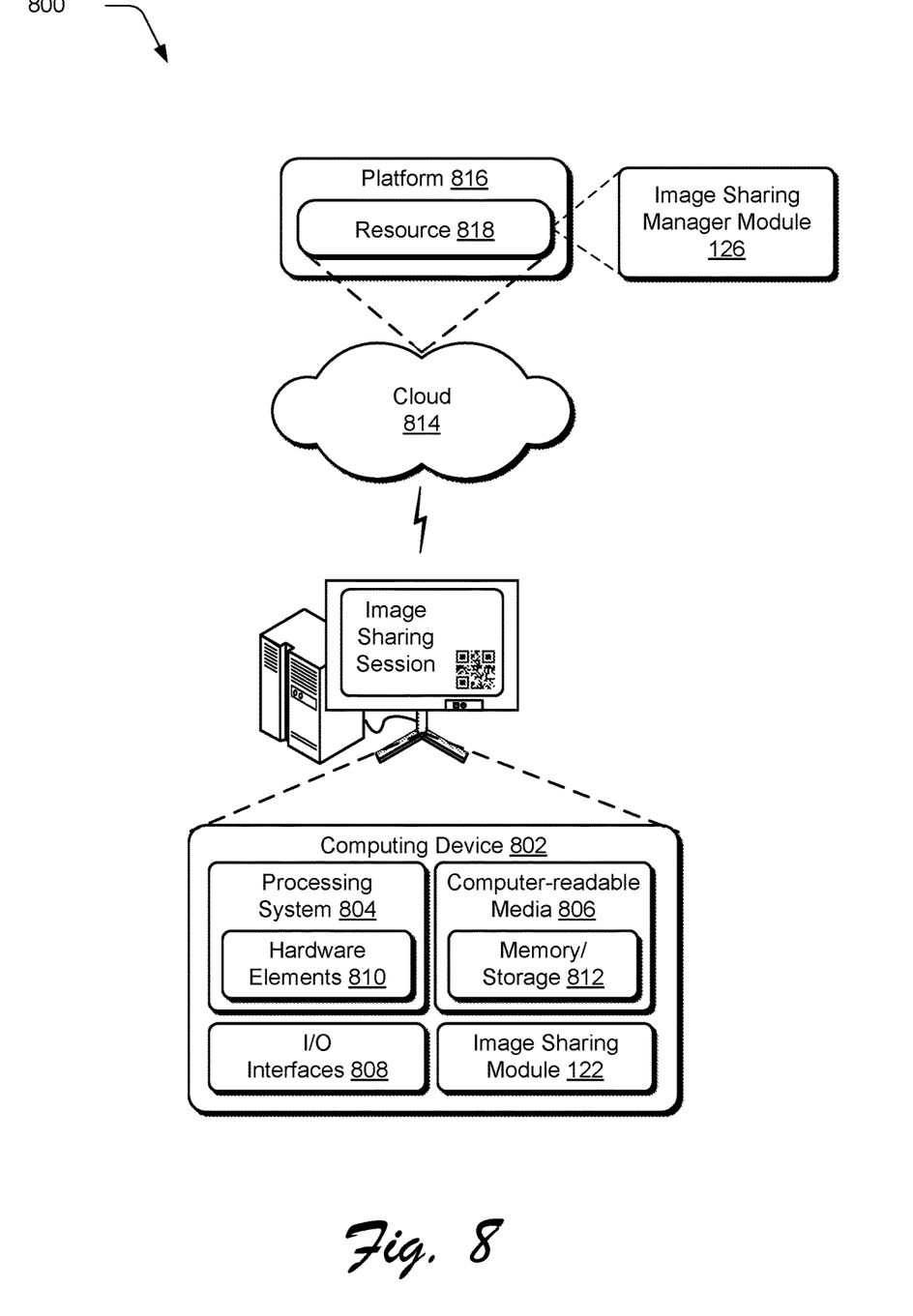
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the image sharing module 122 and image sharing manager module 126. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
  receiving, by the at least one computing device, a request to initiate an image sharing session, the request including information describing an event that corresponds to the image sharing session;
  communicating, by the at least one computing device, the request to a service provider via a network;
  receiving, by the at least one computing device, a session identifier from the service provider via the network in response to the request, the session identifier generated based on the information and by querying a collection of reserved session identifiers and determining that the session identifier is available, the session identifier sharable online or offline and having a corresponding expiration date that is set to last in perpetuity by default;
  distributing, by the at least one computing device, the session identifier for receipt by at least one other computing device, the session identifier acts a credential to join the image sharing session, the session identifier including a network address configured to permit direct access without providing additional credentials by the at least one other computing device to the image sharing session to share digital images as part of the image sharing session, the digital images including pictures of the event; and generating, by the at least one computing device, a user interface that is usable to manage the image sharing session by permitting distribution of the digital images between members of the image sharing session and restricting distribution of the digital images to non-members of the image sharing session.

2. The method as described in claim 1, wherein the request includes a suggested session identifier and the session identifier is generated by the service provider based at least in part on the suggested session identifier.

3. The method as described in claim 1, wherein the information describing the event includes a description of one or more characteristics of the event including at least one of a product name, an event name, a registered or unregistered trademark, and a tagline.

4. The method as described in claim 1, wherein the user interface is usable to manage a membership of the at least one computing device as part of the image sharing session.

5. The method as described in claim 1, wherein the user interface is configured to provide a list of the members of the image sharing session.

6. The method as described in claim 1, wherein the information describing the event includes a location of the event.

7. The method as described in claim 1, wherein the session identifier includes a quick response code.

8. A system comprising:
   means for receiving a request from a computing device via a network to initiate an image sharing session, the image sharing session corresponding to an event and the request including information describing one or more characteristics of the event including a registered or unregistered trademark;
   means for generating a session identifier in response to the request based on the information and by querying a collection of reserved session identifiers and determining that the session identifier is available, the session identifier sharable online or offline and having a corresponding expiration date that is set to last in perpetuity by default and the session identifier acts as a credential to join the image sharing session, the session identifier including a network address that provides direct access to the image sharing session without providing additional credentials to share digital images as part of the image sharing session, the digital images including pictures of the event;
   means for receiving a communication to join the image sharing session from at least one other computing device, the communication generated based on the session identifier;
   means for adding the at least one other computing device as a member of the image sharing session based on the communication; and
   means for generating a user interface that is usable to manage the image sharing session by permitting distribution of the digital images between members of the image sharing session and restricting distribution of the digital images to non-members of the image sharing session.

9. The system as described in claim 8, wherein the generating means generates the session identifier based at least in part on a suggested session identifier.

10. The system as described in claim 8, wherein the user interface is usable to manage membership of the at least one computing device as part of the image sharing session.

11. The system as described in claim 8, wherein the user interface is configured to provide a list of the members of the image sharing session.

12. The method as described in claim 8, wherein the one or more characteristics of the event include a product name.

13. The system as described in claim 8, wherein the session identifier includes a quick response code.

14. A method implemented by at least one computing device, the method comprising:
   receiving, by the at least one computing device, a request to initiate an image sharing session, the image sharing session corresponding to an event;
   communicating, by the at least one computing device, the request to a service provider via a network;
   receiving, by the at least one computing device, a session identifier from the service provider via the network in response to the request, the session identifier generated by querying a collection of reserved session identifiers and determining that the session identifier is available, the session identifier sharable online or offline and having a corresponding expiration date that is set to last in perpetuity by default;
   generating a user interface that is usable to manage sharing of digital images as part of the image sharing session by permitting distribution of the digital images between members of the image sharing session and restricting distribution of the digital images to non-members of the image sharing session, the digital images including pictures of the event; and
   distributing, by the at least one computing device, the session identifier for receipt by at least one other computing device, the session identifier acts as a credential to join the image sharing session, the session identifier including a network address configured to permit direct access by the at least one other computing device to the image sharing session without providing additional credentials to share the digital images as part of the image sharing session.

15. The method as described in claim 14, wherein the request includes a suggested session identifier and the session identifier is generated by the service provider based at least in part on the suggested session identifier.

16. The method as described in claim 14, wherein the request includes one or more characteristics of the event including a name the event.

17. The method as described in claim 14, wherein the request includes one or more characteristics of the event including a product name.

18. The method as described in claim 14, wherein the session identifier includes a quick response code.

19. The method as described in claim 14, wherein the request includes one or more characteristics of the event including a location of the event.

20. The method as described in claim 14, wherein the request includes one or more characteristics of the event including a registered or unregistered trademark.

* * * * *

UNITED STATES PATENT AND TRADEMARK OFFICE
CERTIFICATE OF CORRECTION

PATENT NO. : 10,637,931 B2
APPLICATION NO. : 15/722689
DATED : April 28, 2020
INVENTOR(S) : Richard P. Sinn, Allan M. Young and Thomas T. Donahue It is certified that error appears in the above-identified patent and that said Letters Patent is hereby corrected as shown below:

In the Claims

Column 14, Line 51, after "a name", insert -- of --, therefor.

Signed and Sealed this
Ninth Day of June, 2020

Andrei Iancu
*Director of the United States Patent and Trademark Office*